United States Patent [19]

So

[11] Patent Number: 5,619,222

[45] Date of Patent: Apr. 8, 1997

[54] LIQUID CRYSTAL DISPLAY DEVICE HAVING STATIC ELECTRICITY REMOVING CIRCUITS

[75] Inventor: Hoe S. So, Kyungki-do, Rep. of Korea

[73] Assignee: Goldstar Co., Ltd., Seoul, Rep. of Korea

[21] Appl. No.: 522,860

[22] Filed: Sep. 1, 1995

Related U.S. Application Data

[63] Continuation of Ser. No. 215,188, Mar. 21, 1994, abandoned.

[30] Foreign Application Priority Data

Mar. 24, 1993 [KR] Rep. of Korea ............ 4622/1993

[51] Int. Cl.$^6$ ............................................. G09G 3/36
[52] U.S. Cl. ......................... 345/87; 345/92; 349/42
[58] Field of Search ........................ 345/87, 92, 93, 345/95, 97, 100; 359/59, 60, 54, 87; 257/355, 356, 540

[56] References Cited

U.S. PATENT DOCUMENTS

| | | | |
|---|---|---|---|
| 5,068,748 | 11/1991 | Ukai et al. | 359/59 |
| 5,220,443 | 6/1993 | Noguchi | 359/59 |
| 5,313,319 | 5/1994 | Salisbury | 359/59 |
| 5,373,377 | 12/1994 | Ogawa et al. | 359/54 |

Primary Examiner—Chanh Nguyen
Attorney, Agent, or Firm—John P. White

[57] ABSTRACT

A liquid crystal display device free of breakdown caused by static electricity substrate. The liquid crystal display device includes pixels regularly arranged on the transparent insulating substrate, data bus lines arranged among the pixels on the transparent insulating substrate and adapted to send video data to the pixels, a high level voltage source, a low level voltage source, a gate driving circuit adapted to receive required voltages from the voltage sources and generate gate driving signals, gate bus lines arranged among the pixels such that the gate bus lines cross the data bus lines and adapted to transmit the gate driving signals, a gate insulating film formed on the transparent insulating substrate and adapted to insulate the gate bus lines from the data bus lines, thin film transistors respectively connected to the pixels, the gate bus lines and the data bus lines adapted to apply the video data via the data bus lines to the pixels by switching operations thereof based on the gate driving signals, a single short circuit line connected to the data bus lines, and static electricity removing circuits connected between the gate driving circuit and respective of the gate bus lines and electrically connected in common to the high level voltage source, the low level voltage source and the short circuit line.

6 Claims, 8 Drawing Sheets

PRIOR ART

LIQUID CRYSTAL DISPLAY DEVICE HAVING STATIC ELECTRICITY REMOVING CIRCUITS

This application is a continuation of U.S. Ser. No. 08/215,188, filed Mar. 21, 1994, now abandoned.

BACKGROUND OF THE INVENTION

The present invention relates to a liquid crystal display device, and more particularly to a liquid crystal display device free of breakdown caused by static electricity and the like.

Generally, liquid crystal display devices (LCDs) have an active matrix structure including a plurality of thin film transistors (TFTs) arranged in an active matrix manner on a transparent insulating substrate such as a glass substrate and made of polysilicon or CdSe.

In order to utilize characteristics of polysilicon TFTs, such active matrix LCDs are fabricated by integrating, on to a transparent insulating substrate such as a glass substrate, a plurality of TFTs, a gate driving circuit for driving gates of the TFTs and a video data driving circuit for applying input video data to pixels in an optional order.

By this structure, it is possible to reduce the fabrication cost and the wiring cost, and improve the reliability of the device finally obtained.

Figure 1:
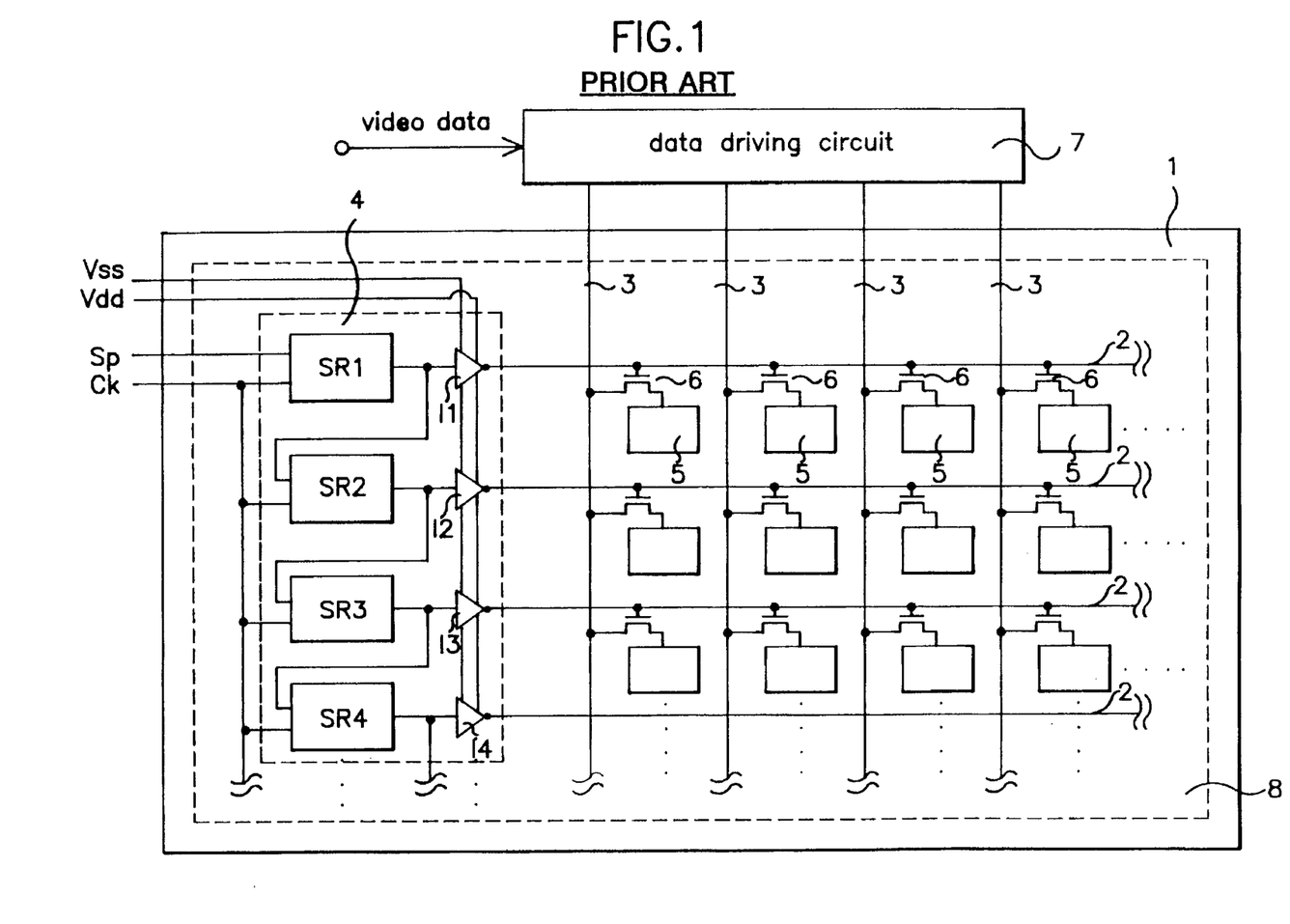
FIG. 1 is a circuit diagram of a conventional liquid crystal display device.

Referring to FIG. 1, there is illustrated a conventional active matrix LCD. As shown in FIG. 1, the active matrix LCD includes a glass substrate 1, a plurality of uniformly spaced gate bus lines 2 formed on the glass substrate 1, and a plurality of uniformly spaced data bus lines 3 formed on the glass substrate 1 and arranged to cross the gate bus lines 3. A gate driving circuit 4 is also provided which applies gate driving signals respectively to the gate bus lines 2 in accordance with a start pulse SP and a clock signal CK. The active matrix LCD further includes a plurality of pixels 5 regularly arranged among the gate bus lines 2 and the data bus lines 3, a plurality of TFTs 6 respectively connected to the pixels 5, the gate bus lines 2 and the data bus lines 3 and adapted to apply the video data received therein via the data bus lines 3 to the pixels 5 in accordance with the gate driving signals, and a data driving circuit 7 for applying data signals to the data bus lines 3 in an optional order in response to the input video data. In FIG. 1, the reference numeral 8 denotes a gate insulating film 8.

As shown in FIG. 1, the gate driving circuit 4 includes a plurality of shift registers $SR_1$, $SR_2$, $SR_3$ ..., and $SR_n$ (in the illustrated case, n is 4) adapted to output sequential signals in response to the input start pulse SP and the input clock signal CK, and a plurality of inverters $I_1$, $I_2$, $I_3$ ..., and $I_n$ (in the illustrated case, n is 4) driven by a high level voltage $V_{DD}$ and a low level voltage $V_{SS}$ applied thereto and adapted to invert the sequential signals received from the shift registers $SR_1$ to $SR_n$, thereby outputting gate driving signals, respectively.

Figure 2:
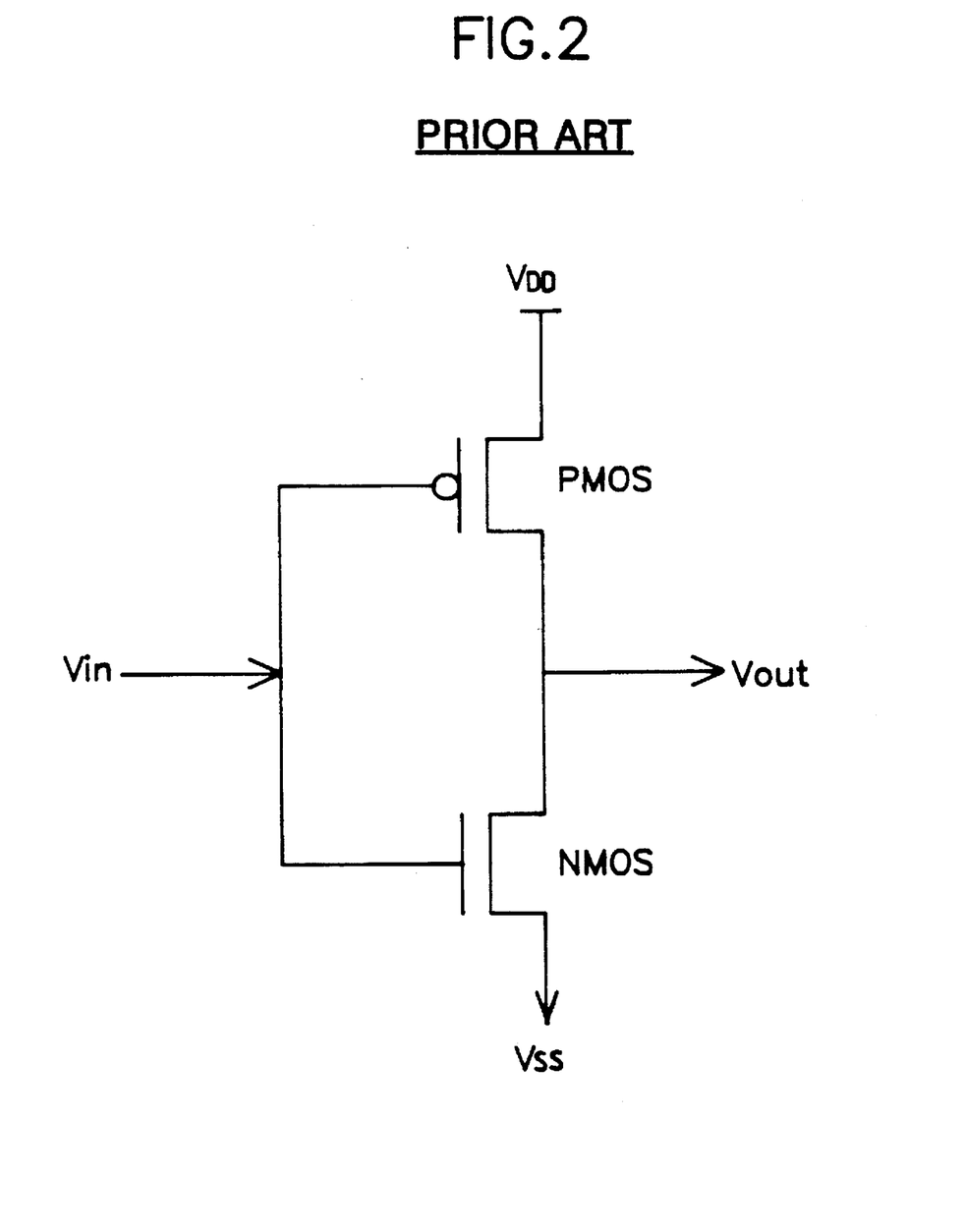
FIG. 2 is a circuit diagram of each inverter shown in FIG. 1.

FIG. 2 is a circuit diagram of each inverter shown in FIG. 1. Generally, the inverter has a complementary metal oxide semiconductor structure including a P-channel metal oxide semiconductor (PMOS) and an N-channel metal oxide semiconductor (NMOS), as shown in FIG. 2.

Now, operation of the conventional LCD device will be described in conjunction with FIG. 1.

The inverters $I_1$ to $I_n$ apply sequentially gate driving signals to the gate bus lines 2 in the order that the uppermost one of the gate bus lines 2 receives first the gate driving signal. On the other hand, the data driving circuit 7 outputs sequentially video data via the data bus lines 3 in the order that the outputting of the video data is begun from the leftmost one of the data bus lines 3. As a result, the video data are sequentially displayed in the order from the leftmost pixel to the rightmost pixel and in the order from the uppermost pixel to the lowermost pixel.

Although not shown in FIG. 1 which is a planar circuit diagram, the gate bus lines 2 should be electrically insulated from the data bus lines 3 (or drain bus lines). For such an electrical insulation, a gate insulating film 8 such as a silicon nitride ($SiN_x$) film is formed between the gate bus lines 2 and the data bus lines 3 by use of a deposition process such as a plasma enhanced chemical vapor deposition (PECVD) process.

This gate insulating film plays an important role for normal operations of the TFTs. However, careful attention must be paid to the formation of the gate insulating film and the preceding or subsequent step to the formation because the gate insulating film has a very small thickness.

For example, a static electricity may be generated during formation of a polysilicon TFT array on the glass substrate 1 as the transparent insulating substrate or liquid crystal injection performed after the formation. Such a static electricity may greatly break down the gate insulating film 8, depending on surrounding environment or moved condition of the substrate.

In other words, the gate insulating film 8 formed between the gate bus lines 2 and the data bus lines 3 may be relatively incomplete or excessively thin at its step portion, as compared to other portions. In this case, the gate insulating film 8 is likely to be broken down due to an impact of static electricity discharged. Through the broken-down portion of the gate insulating film 8, a short circuit between the gate electrodes of the TFTs and the drain electrodes may occur. This serves as a fatal defect in fabrication of an LCD device.

For avoiding such a short circuit between gate and drain electrodes, there has been proposed a method utilizing a short circuit line to which separate voltages $V_{DD10}$ and $V_{SS10}$ are applied.

Figure 3A:
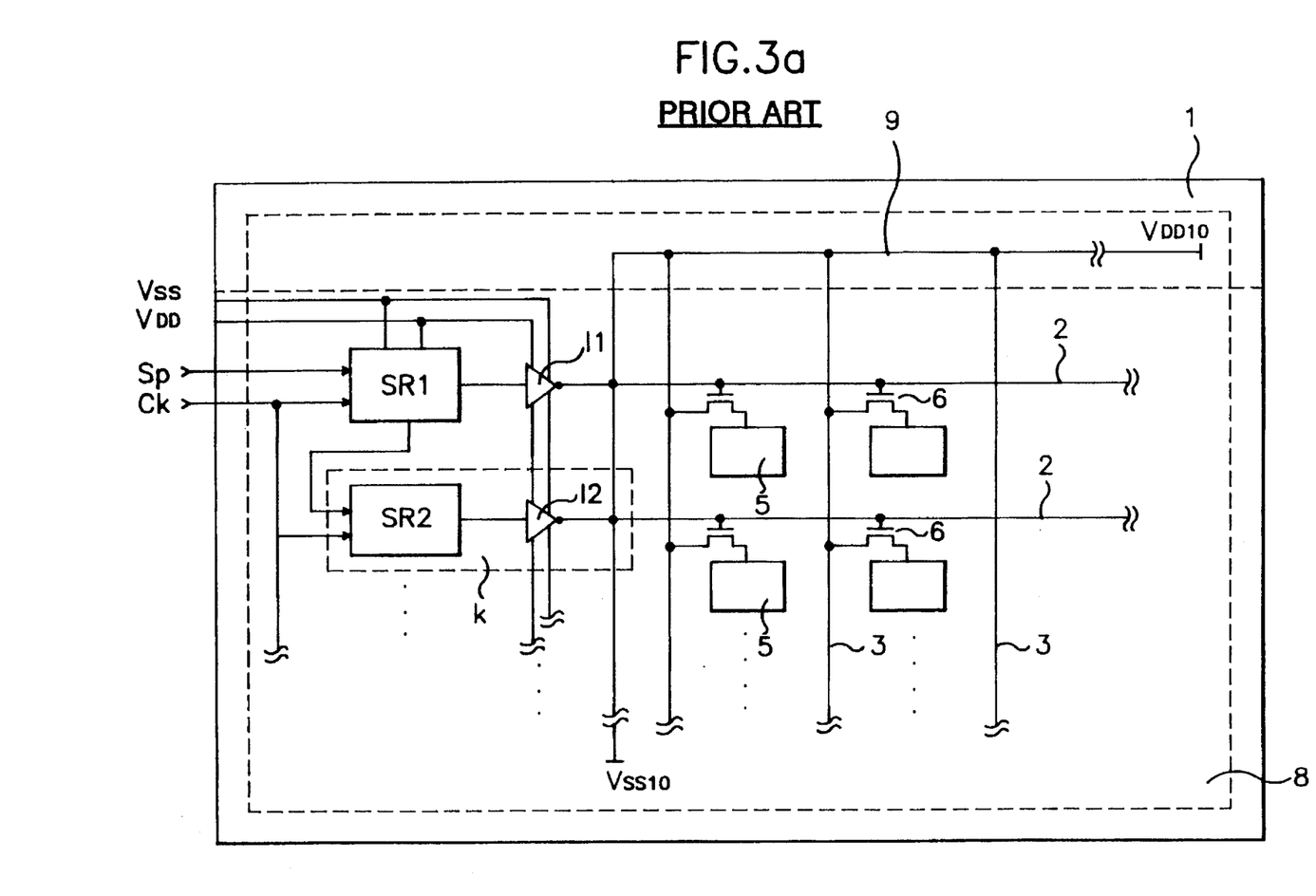
FIG. 3a is a circuit diagram of a conventional liquid crystal display device having a static electricity removal function.

In accordance with this method, a separate short circuit line 9 is provided in an LCD so as to short-circuit all of the data bus lines 2 and the gate bus lines 3, as shown in FIG. 3a.

Even when a static electricity is generated in fabrication of TFTs, the gate bus lines 2 and the data bus lines 3 can always be kept at constant voltage level by virtue of the short circuit line 9. As a result, it is possible to prevent a breakdown of the gate insulating film and a short circuit between the gate electrodes and the drain electrodes in fabrication of TFTs.

Figure 3B:
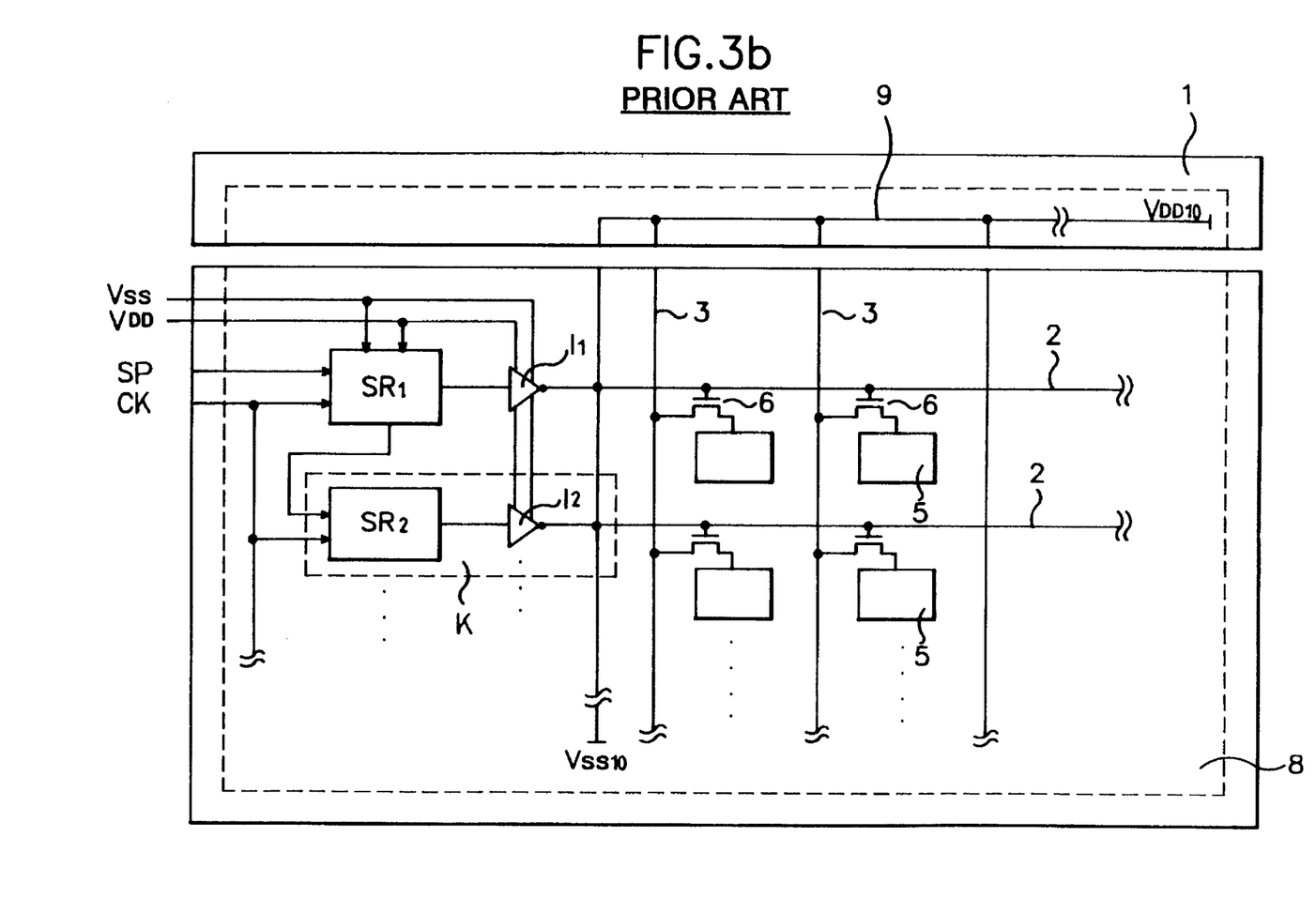
FIG. 3b is a circuit diagram explaining a condition of the liquid crystal display device of FIG. 3a after cutting of a short circuit line.

After completion of the formation of TFTs on the glass substrate 1, a photo-etching process step is performed to cut the short circuit line 9 among the gate bus lines 2, as shown in FIG. 3b.

For an injection of liquid crystal, another substrate is then placed such that it faces the glass substrate 1 formed with the TFT array and then bonded thereto. Thereafter, the liquid crystal injection is carried out. After the liquid crystal injection, the glass substrate 1 is subjected to a cutting work for dividing it into individual LCDs. At this time, the data bus lines 3 are separated from the short circuit line 9. Thus fabrication of a TFT-LCD panel is completed.

Figure 3C:
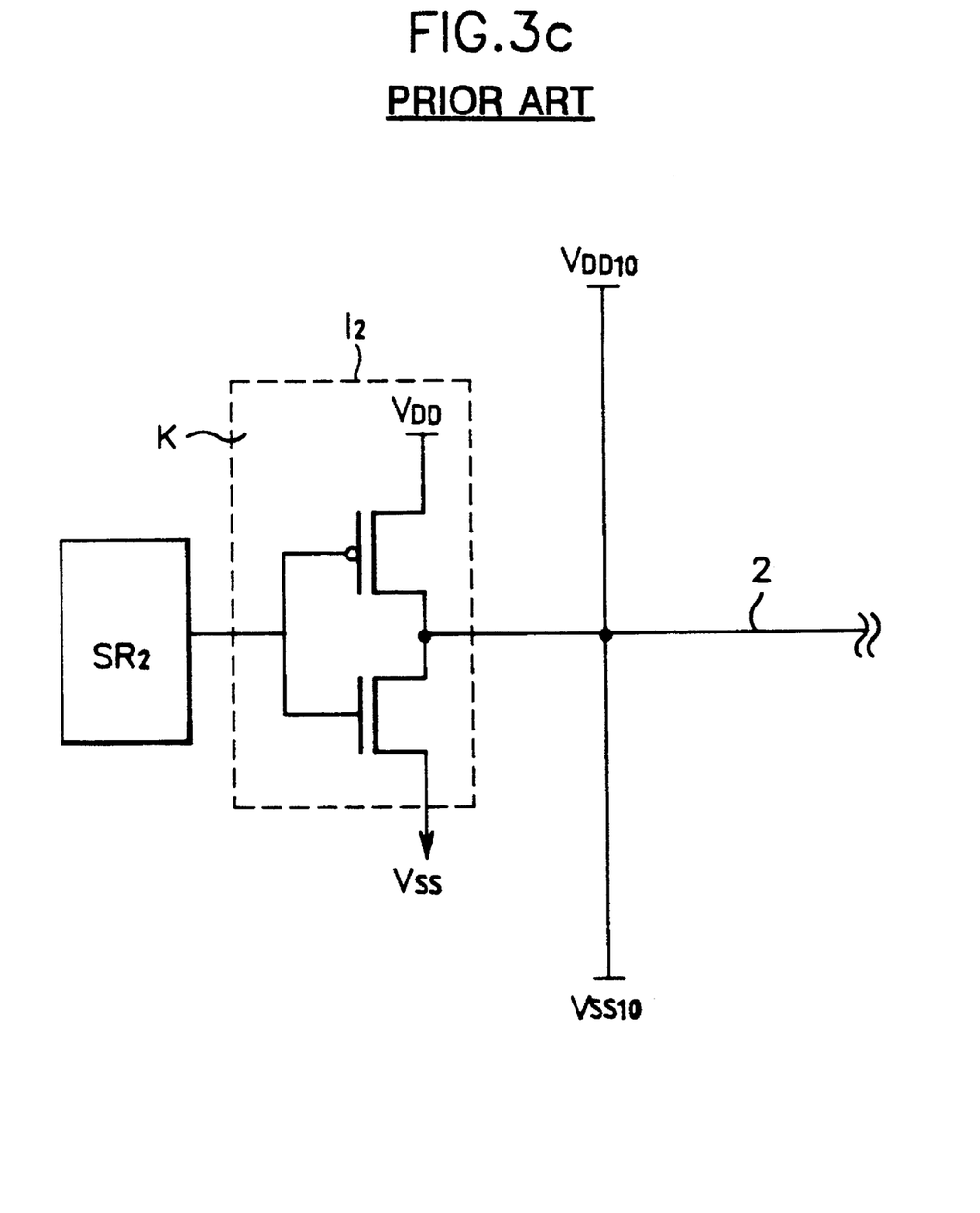
FIG. 3c is a circuit diagram of a region K of FIGS. 3a and 3b.

FIG. 3c shows a circuit diagram of a region K, namely, an inverter $I_2$ of FIGS. 3a and 3b. As shown in FIG. 3c, the inverter $I_2$ includes a PMOS and an NMOS, both of which have drains connected to a common gate line 2. This common gate line 2 is coupled to the short circuit line 9.

If the short circuit line 9 is not provided in the case of FIGS. 3a and 3b, the gate insulating film 8 may be broken down by a static electricity generated on a gate electrode of each TFT 6. This is because there is no current passage provided for discharging charges of the static electricity out of the gate electrode.

Where the short circuit line 9 is provided, however, the static electricity generated on the gate electrode can be freely discharged. As a result, it is possible to avoid a potential difference between the gate bus lines 2 and the data bus lines 3 and, thus, a breakdown of the gate insulating film 8.

Thus, the conventional LCD structure can avoid the breakdown of the gate insulating film 8 caused by the static electricity generated during the fabrication of TFTs on the glass substrate 1.

Since the short circuit line 9 is cut among the gate bus lines 2 after the formation of the TFT array on the glass substrate 1, as shown in FIG. 3b, it no longer plays any role for static electricity generated during subsequent steps for liquid crystal injection after the formation of the TFT array. As a result, the static electricity generated at the liquid crystal injection steps may break down the gate insulating film 8.

In addition to the short circuit line 9, the conventional LCD structure illustrated in FIGS. 3a to 3c needs two electrodes for the application of two additional voltages $V_{DD10}$ and $V_{SS10}$. For formation of such additional electrodes, it is required to perform a separate masking work, and thereby an etching process and photoresist removal process.

As a result, there are drawbacks of a lengthened LCD fabrication time, an increased manufacture cost and an increased probability of failure.

SUMMARY OF THE INVENTION

Therefore, an object of the invention is to eliminate the above-mentioned drawbacks encountered in the conventional LCD structure and, thus, to provide an LCD device free of a breakdown of a gate insulating film due to static electricity generated in fabrication of TFTs and in injection of liquid crystal.

In accordance with the present invention, this object can be accomplished by providing a liquid crystal display device comprising: a transparent insulating substrate; a plurality of pixels regularly arranged on said transparent insulating substrate; a plurality of data bus lines arranged among said pixels on the transparent insulating substrate and adapted to send video data to the pixels in an optional order; a high level voltage source; a low level voltage source; a gate driving circuit adapted to receive required voltages from said voltage sources and generate a plurality of gate driving signals; a plurality of gate bus lines arranged among the pixels such that the gate bus lines cross said data bus lines and adapted to transmit said gate driving signals; a gate insulating film formed on the transparent insulating substrate and adapted to insulate said gate bus lines from the data bus lines; a plurality of thin film transistors respectively connected to the pixels, the gate bus lines and the data bus lines adapted to apply the video data received therein via the data bus lines to the pixels by switching operations thereof based on the gate driving signals; a single short circuit line connected to the data bus lines; and a plurality of static electricity removing circuits connected between said gate driving circuit and respective of the gate bus lines and electrically connected in common to the high level voltage source, the low level voltage source and said short circuit line, for removing static electricity generated at gates of said thin film transistors.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 4A:
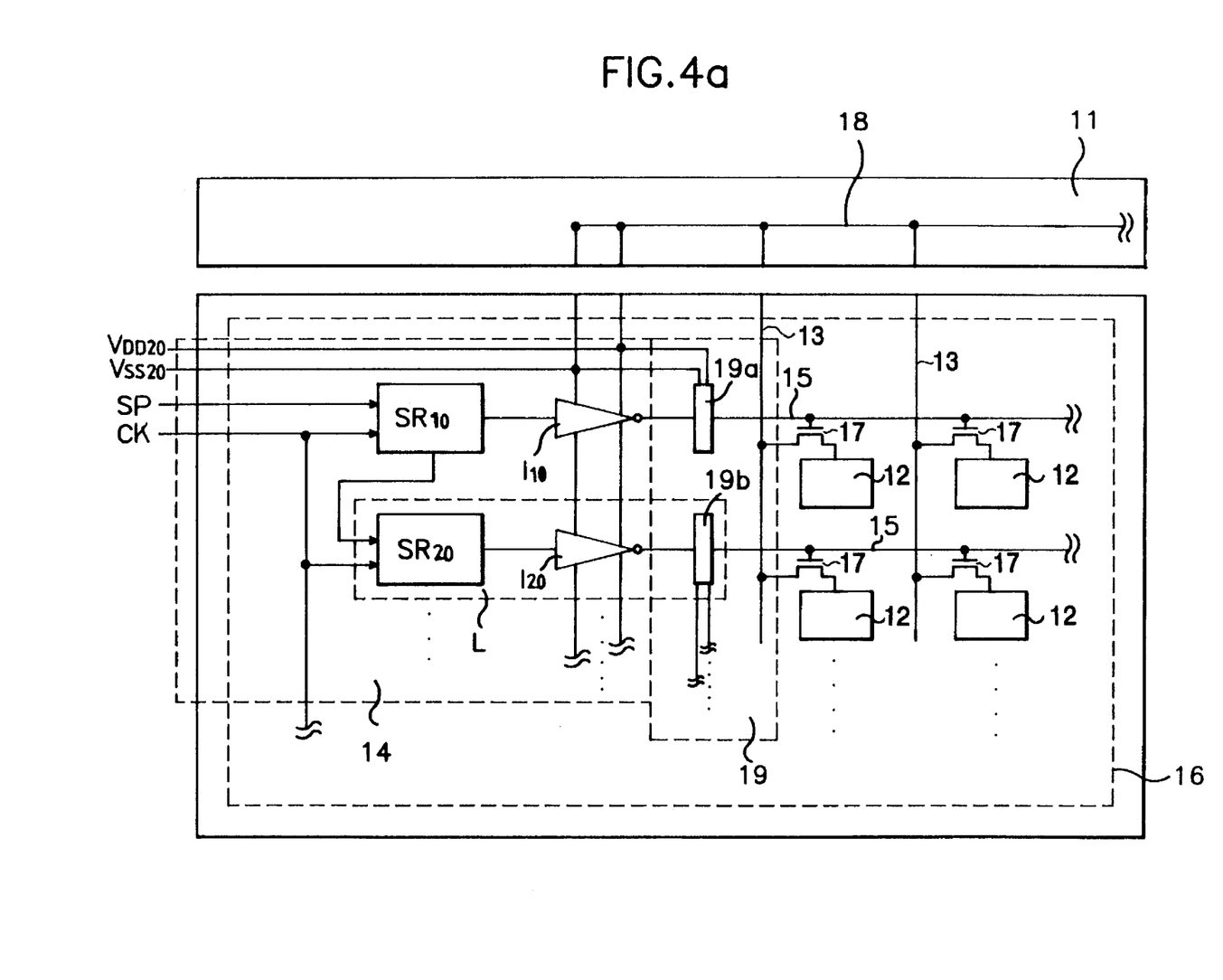
FIG. 4a is a circuit diagram of a liquid crystal display device in accordance with the present invention.

FIG. 4a is a circuit diagram of an LCD device in accordance with the present invention. As shown in FIG. 4a, the LCD device includes a glass substrate 11 as a transparent insulating substrate, a plurality of pixels 12 regularly arranged on the glass substrate 11, a plurality of data bus lines 13 arranged among the pixels 12 on the glass substrate 11 and adapted to send video data to the pixels 12 in an optional order, a high level voltage source $V_{DD20}$, a low level voltage source $V_{SS20}$, a gate driving circuit 14 adapted to receive required voltages from the voltage sources $V_{DD20}$ and $V_{SS20}$ and generate a plurality of gate driving signals, and a plurality of gate bus lines 15 arranged among the pixels 12 such that they cross the data bus lines 13 and adapted to transmit the gate driving signals. A gate insulating film 16 is also provided which insulates the gate bus lines 15 from the data bus lines 13. The LCD device further includes a plurality of TFTs 17 respectively connected to the pixels 12, the gate bus lines 15 and the data bus lines 13 and adapted to apply the video data received therein via the data bus lines 13 to the pixels 12 by switching operations based on the gate driving signals, a short circuit line 18 connected to the data bus lines 13, and a plurality of static electricity removing circuits 19a, 19b . . . , and 19n connected between the gate driving circuit 14 and respective of the gate bus lines 15 and electrically connected to the high level voltage source $V_{DD20}$, the low level voltage source $V_{SS20}$ and the short circuit line 18 so as to remove static electricity generated at the gates of the TFTs 17, respectively.

In the structure of FIG. 4a, the two voltage sources $V_{DD20}$ and $V_{SS20}$ are connected to the short circuit line 18 for the data bus lines 13, as compared to the conventional case wherein two additional voltage sources $V_{DD10}$ and $V_{SS10}$ are used for the short circuit of the gate bus lines 15.

The gate insulating film 16 may be comprised of an insulating film made of, for example, SiN and SiO by use of a deposition process such as the PECVD process.

The glass substrate 11 may be substituted by another transparent insulating substrate made of, for example, quartz.

As shown in FIG. 4a, the gate driving circuit 14 includes a plurality of shift registers $SR_{10}$, $SR_{20}$, . . . , and $SR_{n0}$ adapted to output sequential signals in response to an input start pulse SP and an input clock signal CK, and a plurality of inverters $I_{10}$, $I_{20}$, . . . , and $I_{n0}$ driven by the high level voltage $V_{DD20}$ and the low level voltage $V_{SS20}$ applied thereto and adapted to invert the sequential signals received from the shift registers $SR_{10}$ to $SR_{n0}$, thereby applying gate driving signals to the gate bus lines 15, respectively.

Figure 4B:
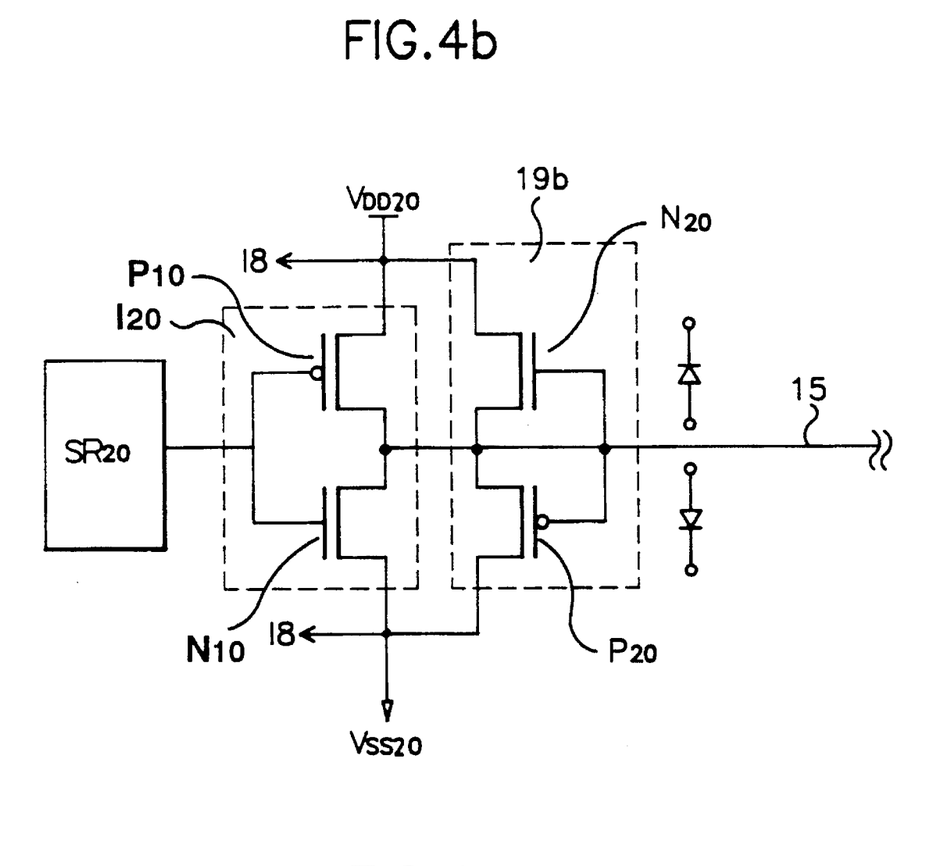
FIG. 4b is a circuit diagram of a region L of FIG. 4a in accordance with a first embodiment of the present invention.

FIG. 4b is a circuit diagram of a region L of FIG. 4a including the inverter $I_{20}$ and the static electricity removing circuit 19b in accordance with a first embodiment of the present invention. This drawing illustrates the structure of each inverter and the structure of each static electricity removing circuit. The inverter $I_{20}$ has a complementary metal oxide semiconductor (CMOS) TFT including a PMOS TFT $P_{10}$ and an NMOS TFT $N_{10}$, as shown in FIG. 4b. The static electricity removing circuit 19b includes an NMOS TFT $N_{20}$ serving as a forward diode and a PMOS TFT $P_{20}$ serving as a backward diode.

The structure of FIG. 4b including each inverter and each static electricity removing circuit will be described in detail. The structure corresponding to the region L includes the shift register $SR_{20}$ adapted to output one sequential signal, the PMOS TFT $P_{10}$ connected at the gate thereof to the output of the shift register $SR_{20}$ and at the source thereof to both the high level voltage source $V_{DD20}$ and the short circuit line 18, the NMOS TFT $N_{10}$ connected at the gate thereof to the output of the shift register $SR_{20}$ together with the gate of the PMOS TFT $P_{10}$, at the source thereof to both the low level voltage source $V_{SS20}$ and the short circuit line 18 and at the drain thereof to the corresponding gate bus line 15 together with the drain of the PMOS TFT $P_{10}$, an NMOS TFT $N_{20}$ connected at the source thereof to the high level voltage source $V_{DD20}$ and the short circuit line 18 together with the drain of the PMOS TFT $P_{10}$ and at the gate and drain thereof to the corresponding gate bus line 15 so as to serve as a forward diode, and a PMOS TFT $P_{20}$ connected at the source thereof to both the low level voltage source $V_{SS20}$ and the short circuit line 18 together with the source of the NMOS TFT $N_{20}$ and at the gate and drain thereof to the gate bus line 15 so as to serve as a backward diode.

Figure 4C:
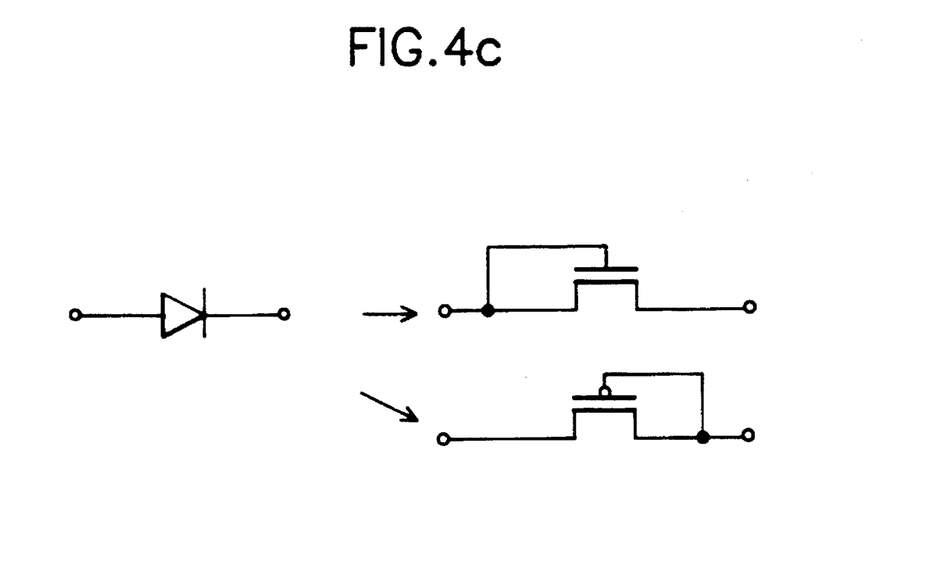
FIG. 4c is a circuit diagram explaining a case wherein MOS TFTs are used as diodes.

Referring to FIG. 4c, it can be found that each NMOS TFT in which its gate and drain are connected to each other is used as the forward diode whereas each PMOS TFT in which its gate and drain are connected to each other is used as the backward diode.

Figure 4D:
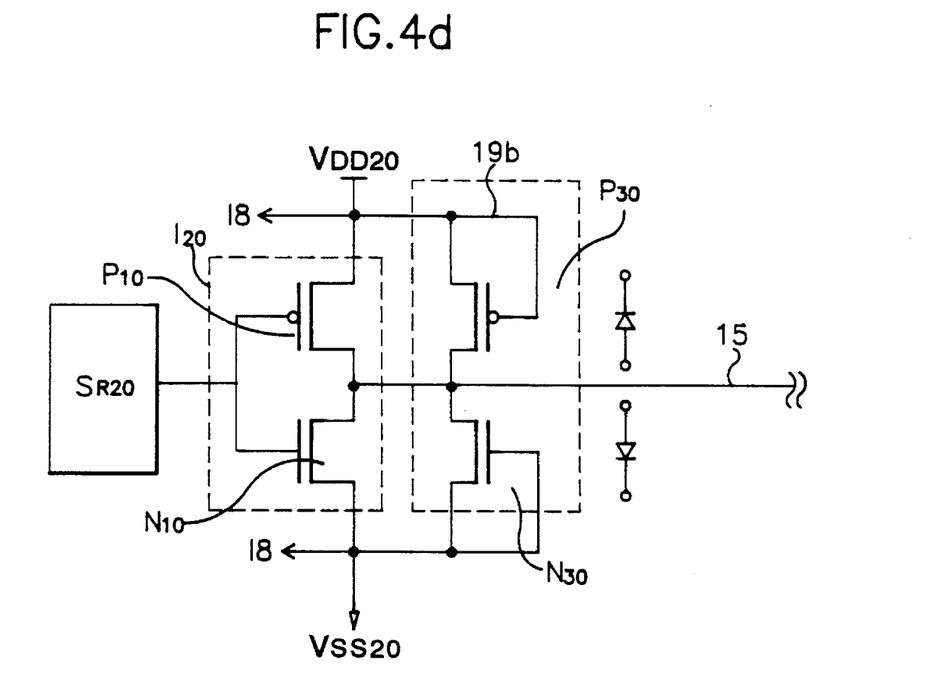
FIG. 4d is a circuit diagram of the region L of FIG. 4a in accordance with a second embodiment of the present invention.

FIG. 4d is a circuit diagram of another structure corresponding to the region L of FIG. 4a in accordance with a second embodiment of the present invention. This structure includes the same constitution for the gate driving circuit 14 as that of FIG. 4b, but a different constitution for the static electricity removing circuit 19b from that of FIG. 4b.

In this case, the static electricity removing circuit 19b includes a PMOS TFT $P_{30}$ connected at the drain thereof to the corresponding gate bus line 15 and at the source and gate thereof to both the high level voltage source $V_{DD20}$ and the short circuit line 18 so as to serve as a forward diode, and an NMOS TFT $N_{30}$ connected at the drain thereof to the corresponding gate bus line 15 together with the drain of the PMOS TFT $P_{30}$ and at the source and gate thereof to both the low level voltage source $V_{SS20}$ and the short circuit line 18 so as to serve as a backward diode.

Figure 4E:
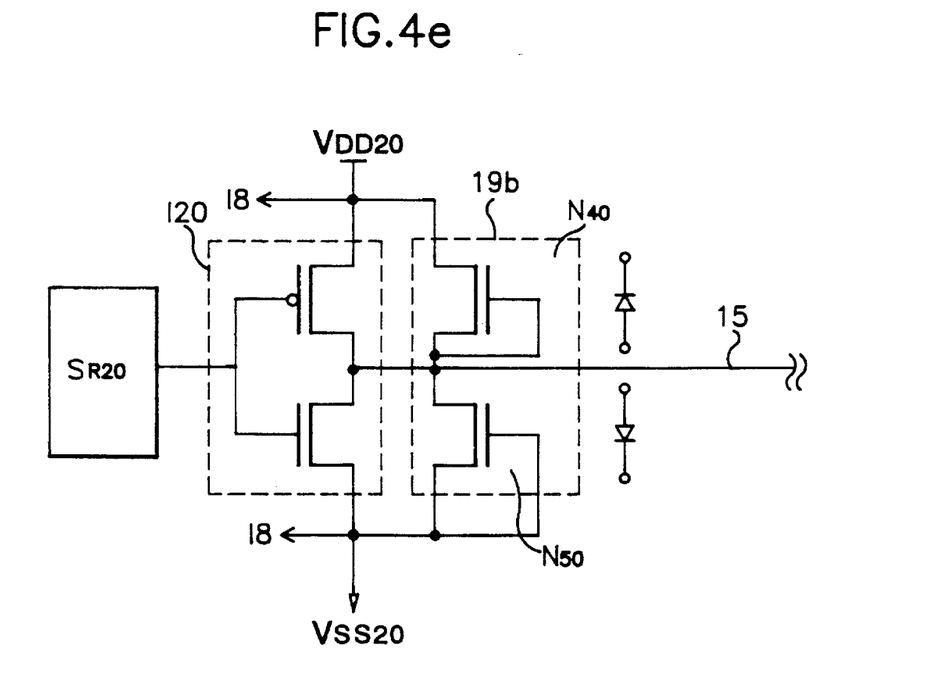
FIG. 4e is a circuit diagram of the region L of FIG. 4a in accordance with a third embodiment of the present invention.

FIG. 4e is a circuit diagram of another structure corresponding to the region L of FIG. 4a in accordance with a third embodiment of the present invention. This structure includes the same constitution for the gate driving circuit 14 as that of FIG. 4b, but a different constitution for the static electricity removing circuit 19b from that of FIG. 4b.

In this case, the static electricity removing circuit 19b includes an NMOS TFT $N_{40}$ connected at the source thereof to both the high level voltage source $V_{DD20}$ and the short circuit line 18 and at the gate and drain thereof to the corresponding gate bus line 15 so as to serve as a forward diode, and an NMOS TFT $N_{50}$ connected at the drain thereof to the corresponding gate bus line 15 and at the source and gate thereof to both the low level voltage source $V_{SS20}$ and the short circuit line 18 so as to serve as a backward diode.

In the above cases of FIGS. 4b, 4d and 4e, each static electricity removing circuit constituted by two TFTs is connected to the output of the gate driving circuit 14 and between the high level voltage source $V_{DD20}$ and the low level voltage source $V_{SS20}$.

When the LCD device operates normally, accordingly, the potential of the gate bus line 15 is kept at a level lower than that of the high level voltage source $V_{DD20}$, but higher than that of the low level voltage source $V_{SS20}$. This state corresponds to the state that no static electricity is generated at the gates of TFTs 17. As a result, no current flows in the short circuit line 18 via the gate bus line 15 and the static electricity removing circuit 19.

When a static electricity is generated on the gate bus line 15 in fabrication of the TFTs 17 on the glass substrate 11 or in liquid crystal injection, however, the gate bus line 15 has a potential higher than that of the high level voltage source $V_{DD20}$ or lower than that of the low level voltage source $V_{SS20}$ in the case of FIG. 4b. Where the potential of the gate bus line 15 is higher than that of the high level voltage source $V_{DD20}$ due to the static electricity generated, the NMOS TFT $N_{20}$ serving as the forward diode operates. By the operation of the NMOS TFT $N_{20}$, static electricity charges flow into the high level voltage source $V_{DD20}$ via the NMOS TFT $N_{20}$ and are then discharged through the short circuit line 18. Thus the static electricity charges can be safely removed.

The structure of FIG. 4d corresponds to the structure obtained by interchanging positions of the PMOS TFT $P_{20}$ and NMOS TFT $N_{20}$ in the case of FIG. 4b. In the case of FIG. 4d, accordingly, the PMOS TFT $P_{30}$ serves as the forward diode while the NMOS TFT $N_{30}$ serves as the backward diode.

The operation of the static electricity removing circuit 19b shown in FIG. 4d is identical to that of FIG. 4b and, thus, its description will be omitted.

In the case of FIG. 4e, the static electricity removing circuit 19b is constituted only by the NMOS TFTs $N_{40}$ and $N_{50}$. In this case, the NMOS TFT $N_{40}$ serves as the forward diode while the NMOS TFT $N_{50}$ serves as the backward diode.

In the circuit of FIG. 4e, the potential of the gate bus line 15 is kept at a level between the high level voltage $V_{DD20}$ and the low level voltage $V_{SS20}$ in a normal operation, similar to the case of FIG. 4b. In other words, the static electricity removing circuit 19b does not operate because the potential of the gate bus line 15 is maintained between the high level voltage $V_{DD20}$ and the low level voltage $V_{SS20}$.

When the potential of the gate bus line 15 is higher than the high level voltage $V_{DD20}$ due to charges generated at the gates of the TFTs 17 by a static electricity, the NMOS TFT $N_{40}$ serving as the forward diode operates. By the operation of the NMOS TFT $N_{40}$, static electricity charges flow into the high level voltage source $V_{DD20}$ via the NMOS TFT $N_{40}$ and are then discharged through the short circuit line 18.

On the other hand, when the potential of the gate bus line 15 is lower than the low level voltage $V_{SS20}$, static electricity charges flow into the low level voltage source $V_{SS20}$ via the NMOS TFT $N_{50}$ and are then discharged through the short circuit line 18. As a result, it is possible to avoid a breakdown of the gate insulating film 16 due to the generation of static electricity and, thus, to avoid a failure in fabrication of an LCD device.

After completion of the LCD device, the short circuit line 18 is removed by use of a dry etching process upon cutting of the glass substrate 11.

As apparent from the above description, the LCD device of the present invention has the following effects.

First, it is possible to avoid a breakdown of the gate insulating film due to the generation of static electricity and, thus, to avoid a failure in fabrication because static electricity possibly generated among the gate bus lines and the data bus lines in fabrication of TFTs and in liquid crystal injection can be automatically and safely removed.

Second, it is possible to reduce the number of steps required in fabrication of the LCD device and the LCD manufacture cost is decreased because the short circuit line is directly connected to both different voltage sources of the gate driving circuit without an addition of any separate voltage source requiring an additional masking step, a photoresist removing step and an etching step.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A liquid crystal display device comprising:

a plurality of gate lines and a plurality of data lines arranged in a matrix;

a short-circuit line connected to the data lines;

voltage supplying means for supplying a voltage, the voltage supplying means including a high level voltage source and a low level voltage source;

a plurality of gate driving circuits, each gate driving circuit being connected to a corresponding gate line and the voltage supplying means; and a plurality of static electricity removing circuits being connected to a corresponding gate driving circuit, the short-circuit line, the corresponding gate line, and directly connected to the voltage supplying means, wherein each of the static electricity removing circuits comprises
      a NMOS transistor, including a source connected to the short-circuit line and the high level voltage source, a gate connected to the corresponding gate line and a drain connected to the corresponding gate line, and
      a PMOS transistor, including a source connected to the short-circuit line and the low level voltage source, a gate connected to the corresponding gate line and a drain connected to the corresponding gate line.

2. A device as claimed in claim 1, wherein each gate driving circuit includes a plurality of shift registers and a plurality of inverters being driven by the voltage supplying means.

3. A liquid crystal display device comprising:

a plurality of gate lines and a plurality of data lines arranged in a matrix;

a short-circuit line connected to the data lines;

voltage supplying means for supplying a voltage, the voltage supplying means including a high level voltage source and a low level voltage source;

a plurality of gate driving circuits, each gate driving circuit being connected to a corresponding gate line and the voltage supplying means; and a plurality of static electricity removing circuits being connected to a corresponding gate driving circuit, the short-circuit line, the corresponding gate line, and directly connected to the voltage supplying means, wherein each of the static electricity removing circuits comprises
      a PMOS transistor, including a gate connected to the short-circuit line and the high level voltage source, a source connected to the short-circuit line and the high level voltage source and a drain connected to the corresponding gate line, and
      a NMOS transistor, including a gate connected to the short-circuit line and the low level voltage source, a source connected to the short-circuit line and the low level voltage source and a drain connected to the corresponding gate line.

4. A device as claimed in claim 3, wherein each gate driving circuit includes a plurality of shift registers and a plurality of inverters being driven by the voltage supplying means.

5. A liquid crystal display device comprising:

a plurality of gate lines and a plurality of data lines arranged in a matrix;

a short-circuit line connected to the data lines;

voltage supplying means for supplying a voltage, the voltage supplying means including a high level voltage source and a low level voltage source;

a plurality of gate driving circuits, each gate driving circuit being connected to a corresponding gate line and the voltage supplying means; and a plurality of static electricity removing circuits being connected to a corresponding gate driving circuit, the short-circuit line, the corresponding gate line, and directly connected to the voltage supplying means, wherein each of the static electricity removing circuits comprises
      a first NMOS transistor, including a source connected to the short-circuit line and the high level voltage source, a drain connected to the corresponding gate line and a gate connected to the drain and the corresponding gate line, and
      a second NMOS transistor, including a drain connected to the corresponding gate line, a source connected to the short-circuit line and the low level voltage source and a gate connected to the source.

6. A device as claimed in claim 5, wherein each gate driving circuit includes a plurality of shift registers and a plurality of inverters being driven by the voltage supplying means.

* * * * *